Dec. 10, 1935.                P. B. R. BAAS                2,023,503
                    REMOTE PRESSURE CONTROL APPARATUS
                      Filed Jan. 18, 1934        2 Sheets-Sheet 2

WITNESSES
Edw. Thorpe
J. W. Foster

INVENTOR
Philip B. R. Baas
BY
Munn, Anderson, Stanley, Foster & Liddy
ATTORNEY

Patented Dec. 10, 1935

2,023,503

UNITED STATES PATENT OFFICE 2,023,503

REMOTE PRESSURE CONTROL APPARATUS

Philip B. R. Baas, Brooklyn, N. Y., assignor to Brooklyn Borough Gas Company, Brooklyn, N. Y., a corporation of New York Application January 18, 1934, Serial No. 707,228

10 Claims. (Cl. 50—10)

This invention relates to automatic remote pressure control apparatus, and while it is especially adapted for use in connection with the control of gas pressures in mains it is obvious that the invention is not limited to the pressure of gas as it may be employed to control pressures of fluid of any kind, although for convenience of description and to prevent repetition the invention will hereinafter be referred to and described in connection with gas such as ordinarily supplied through mains for consumption in municipalities.

An object of the invention is to provide, in addition to equipment in ordinary use, automatic means which will regulate pressure in high and low pressure mains, and insure in the low pressure mains a uniform pressure regardless of the gas consumption. It is a well known fact that in the low pressure mains the demand for and consumption of gas fluctuates greatly during different hours of the day, and it is the broad purpose of my invention to provide apparatus which will automatically maintain in the low pressure mains a uniformity of pressure under all conditions.

It is also the broad purpose of my invention to provide automatic means of this character which, if for any reason, becomes inoperative it will not in any way interfere with such controls as are now in use, but when my improved automatic means is in operation it will cut-out present controlling means and function in lieu thereof.

A further object is to provide an improved construction and arrangement of magnetic linkage between a one hundred eighty (180°) degree reversible motor and a pilot control on what is generally known as a district governor, the magnetic linkage operating as a clutch between the motor and the pilot so that in the event there is a failure of electric current for any reason the magnetic linkage will cease to function and the district governor will function, as before.

With these and other objects in view, the invention consists in certain novel features of construction and combinations and arrangements of parts, all of which will be more fully hereinafter described and pointed out in the claims.

In the accompanying drawings—

Figure 1:
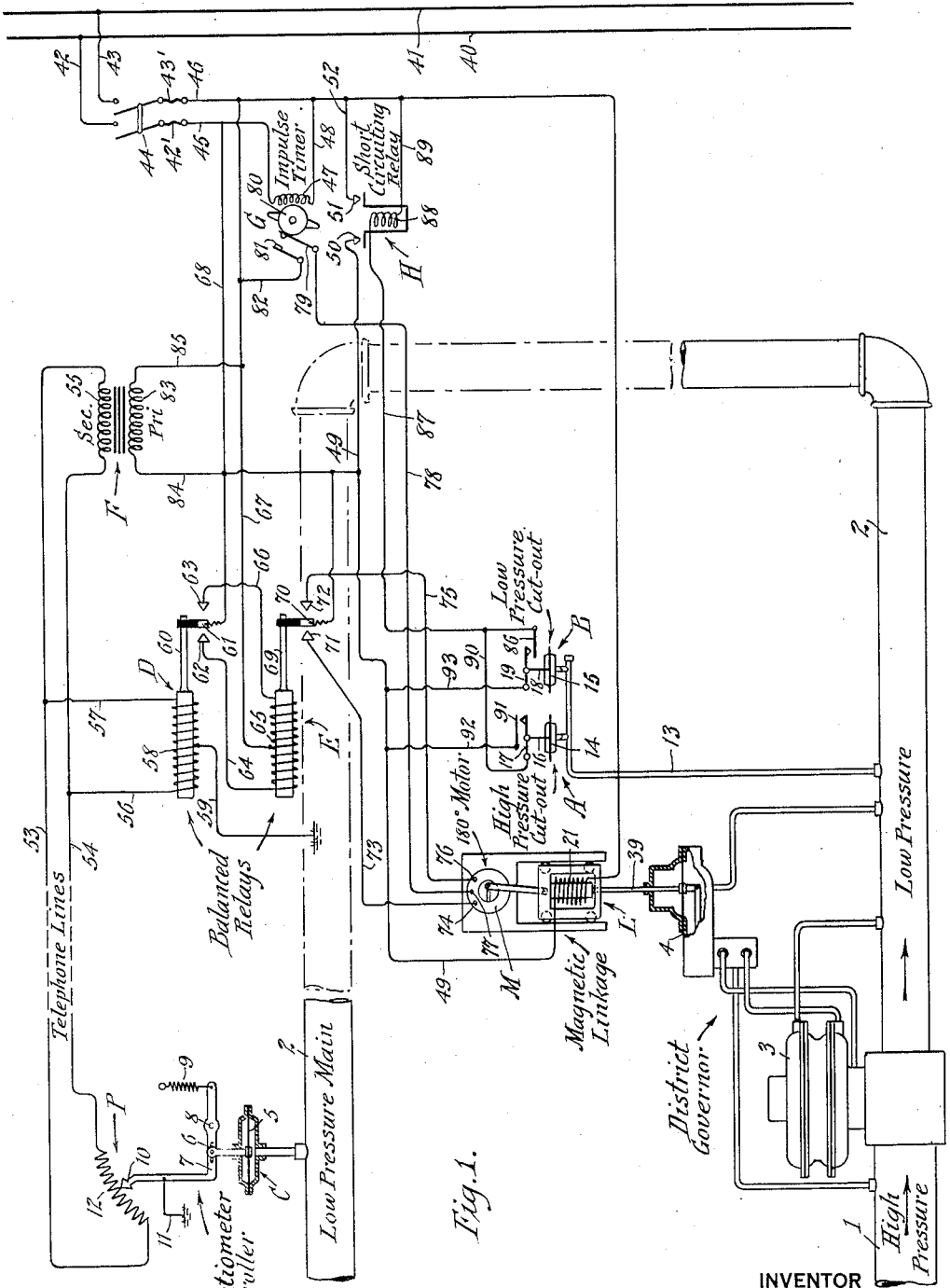
Figure 1 is a diagrammatic view illustrating my invention.

Referring more particularly to Figure 1 of the drawings, 1 represents a high pressure main which communicates with a low pressure main 2, and at the juncture of these mains a controller 3 is located and this controller, known as a district governor, is in common use and operates to insure a variation in pressures between the mains.

In connection with the district governor 3 a pilot governor 4 is employed which, when functioning, operates as a positively moving valve mechanism to control the variance in pressures between the high and low pressure mains, but when not positively functioning permits the district governor 3 to function in its ordinary manner. This pilot governor 4 is positively operated through the medium of my improved magnetic linkage, indicated generally by the character reference L, which operatively connects the valve mechanism of the pilot control 4 with a one hundred eighty degree electric motor, indicated generally by the reference character M. This motor M moves through one hundred eighty (180°) degrees and has a very small stroke, all of which will be more fully hereinafter described.

On the low pressure main 2 at a point distant from the district governor 3 a controller C is located, and constitutes a casing communicating with the low pressure main and having a diaphragm 5 therein sensitive to pressure in the main. This diaphragm 5 is connected by a link 6 to a lever 7, the connection between the link and the lever being at one side of the pivot 8 of the lever, and a spring coil 9 is located at the other side of the lever to balance the lever. The lever 7 carries a contact arm 10 which is electrically grounded, as shown at 11, and is adapted to move longitudinally of a resistance coil 12, said coil and contact constituting a potentiometer, indicated as a whole by the reference character P.

A high pressure cut-out A and a low pressure cut-out B communicate with the low pressure main and may be operatively connected to a pipe 13 which in turn is connected to the low pressure main. These high and low pressure cut-outs both comprise casings having diaphragms 14 and 15, respectively, therein which are sensitive to the pressure in the main. The diaphragm 14 of the high pressure cut-out is connected by a linkage 16 with a contact lever 17, and the diaphragm 15 of the low pressure cut-out B is connected by a linkage 18 with a contact lever 19.

In my improved electric circuit I employ two electrically balanced relays D and E, a transformer F, a motor constituting an impulse timer G and a short circuiting relay H, all of which will be more fully described in connection with the particular circuit which is illustrated in Figure 1 of the drawings. The balanced relays D and E constitute balanced solenoids, and the reason I employ two of these balanced solenoids is because the current required to operate a reversible motor is greater than is ordinarily permitted to be carried on ordinary telephone circuits. Therefore, the telephone circuit hereinafter described includes the balanced relay or solenoid D, and the balanced relay or solenoid E is in circuit with the motor.

Figure 2:
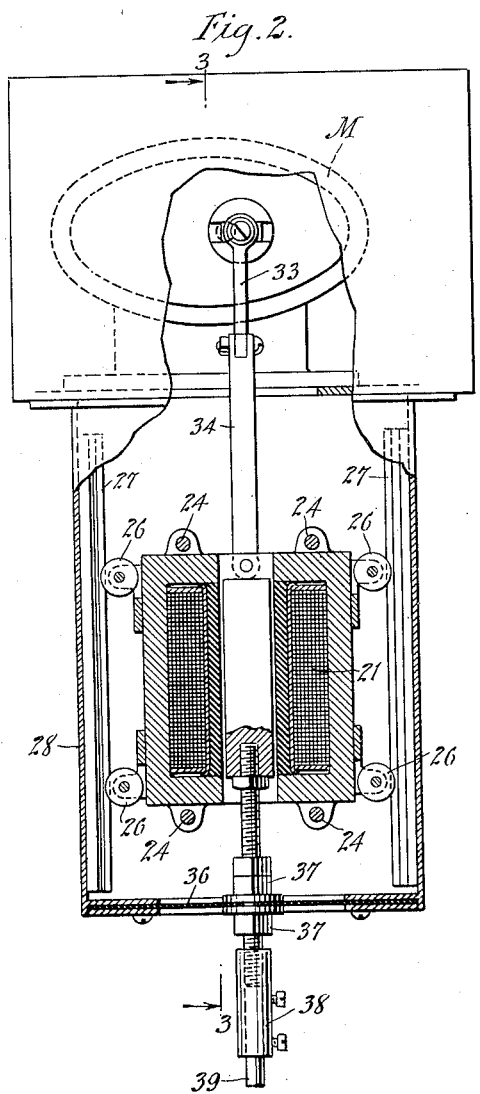
Figure 2 is a view partly in elevation and partly in longitudinal section illustrating my improved magnetic linkage.
Figure 3:
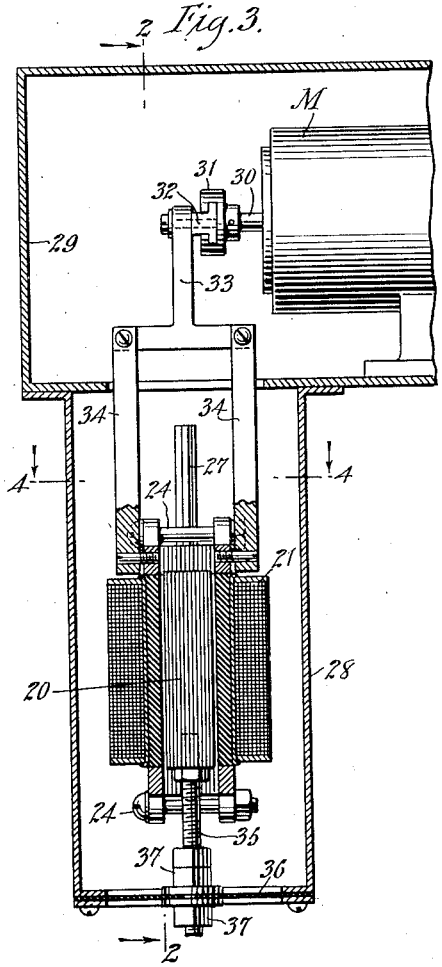
Figure 3 is a view in section on the line 3—3 of Figure 2.
Figure 4:
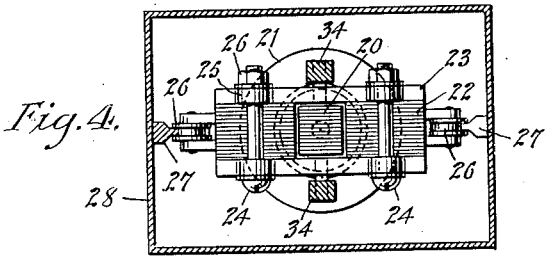
Figure 4 is a view in section on the line 4—4 of Figure 3.

Before describing the circuit I shall describe the magnetic linkage, attention being directed particularly to Figures 2, 3 and 4 of the drawings. The essential feature of this linkage is a magnetic clutch which comprises a central armature 20 movably mounted in a field comprising a winding 21 supported in laminated plates 22, which are clamped between side plates 23, and bolts 24 are projected through perforated lugs 25 on the plates 23 and having nuts 26 thereon clamping the parts together. The armature 20 is preferably rectangular in cross section, movable in a rectangular opening in the field, and is also preferably made up of laminated plates. At the sides of the field rollers 26 are mounted and engage rails 27 at the sides of the casing 28 to guide the linkage in its vertical reciprocations. This casing 28 is fixed and depends from a casing 29 which encloses the motor M but, as above stated, this motor is a one hundred and eighty (180°) degree motor; that is to say, it moves its shaft 30 and crank disk 31 through an arc of 180° backwardly and forwardly. This crank disk is grooved to receive an adjustable coupling pin 32, so that by adjusting this pin in the groove the stroke imparted by the motor can be varied. An inverted T-shaped link 33 is pivotally connected to the pin 32 and the lower portion of this link 33 is pivotally connected by links 34 with the plates 23.

A depending screw-threaded rod 35 is secured in the lower end of the armature 20 and projects through a leather or other suitable diaphragm 36 closing the lower end of the casing 28, and nuts 37 are located on the rod 35 at opposite sides of the diaphragm 36 and are clamped thereto. The lower end of the rod 35 is adjustably connected by a coupling sleeve 38 with a rod 39, and this rod 39 extends into and operates the pilot control 4, as shown in Figure 1 of the drawings. It is obvious that when the magnetic clutch is energized the field and armature will be coupled so that the movements of the linkage, due to the motor M, will be transmitted to the pilot control 4, and when the magnetic clutch is de-energized the magnetic field will move relatively to the armature and no motion will be imparted to the pilot control.

Referring again to the diagram in Figure 1, 40 and 41 represent supply wires, which are tapped by lead-in wires 42 and 43, respectively. These lead-in wires 42 and 43 are connected by a manually operated switch 44 and fuses 42' and 43' with wires 45 and 46 respectively. The wire 45 extends to and is connected to one terminal of the motor field 47 of the impulse timer G, and the other terminal of the motor field 47 is connected by a wire 48 with wire 46. The wire 46 extends to and is connected with the lower end of the field winding 21 of the magnetic linkage L, the other end of said winding being connected through wires 49 and 84 and 68 to 45 which also extend to a contact 50 of the short circuiting relay H through a wire 49, the other contact 51 of said relay being connected by a wire 52 with the wire 46. Telephone lines 53 and 54 connect the respective ends of the coil 12 with the respective ends of the secondary winding 55 of the transformer F. The telephone lines 53 and 54 are connected by wires 56 and 57 with the respective ends of a coil 58 of the balanced relay D. A wire 59 is connected to the center of the coil 58 and is grounded, as illustrated.

An armature 60 of the relay D carries an insulated contact 61 which is normally disposed between and spaced from contacts 62 and 63 respectively. The contact 62 is connected by a wire 64 with one end of the coil 65 of the relay E, and the contact 63 is connected by a wire 66 with the other end of said coil. The center of the coil 65 is connected by a wire 67 with wire 46, and the contact 61 on the armature 60 is connected by a wire 68 with the wire 45. An armature 69 of relay E carries an insulated contact 70, normally disposed between and spaced from contacts 71 and 72. The contact 71 is connected by a wire 73 with an outer terminal 74 of motor M. The contact 72 is connected by a wire 75 with the other outer terminal 76 of motor M. The intermediate terminal 77 of motor M is connected by a wire 78 with a movable contact arm 79 operated by the rotary member 80 of the impulse timer G.

A stationary contact 81 of the impulse timer is connected by a wire 82 with the wire 67. One end of the primary coil 83 of the transformer F is connected by a wire 84 with wire 68, and the other end of said primary coil is connected by a wire 85 with the wire 67.

86 represents a contact normally spaced from but adapted to be engaged by the pivoted lever 40 19 of the low pressure cut-out B. This contact 86 is connected by a wire 87 with one end of an operating coil 88 of the short circuiting relay H, the other end of said coil being connected by a wire 89 with wire 46. The pivoted lever 17 in the high pressure cut-out A is connected by a wire 90 with the wire 87. A stationary contact 91 of the high pressure cut-out A is connected by a wire 92 with the wire 49. The pivoted lever 19 of the low pressure cut-out B is connected by a wire 93 with the wire 49. The wire 84 which connects one end of the primary coil of the transformer F with the wire 49 is also electrically connected to the wire 68 so that normally the magnetic linkage is energized, as indicated in the diagram.

In a system of this character every precaution must be taken to insure safety. There are three conditions which might arise which would result in de-energizing the magnetic linkage L and discontinue the operation of the pilot control 4. One of these conditions is a complete failure of electric current. Instantly the magnetic linkage would be de-energized and the district governor 3 would resume its ordinary functions; secondly, there may be a grounding, short circuiting, or open circuit in the telephone lines, in which event the control circuit would become unbalanced causing the control to increase or decrease the pressure in the low pressure main and thereby cause the high pressure or low pressure cut-out to function and energize the short circuiting relay H, causing the short circuiting of the fuses 42' and 43' and dropping the entire load from the line; the magnetic linkage will be then de-energized, no motion will be transmitted to the pilot control 4, and the district governor 3 will function. Assuming that the system is functioning normally the impulse timer G, which is continuously revolving, causes the contacts 79 and 81 to close twice each minute, thus giving an impulse to the motor M to operate the pilot control 4 every thirty seconds, providing the circuit is unbalanced requiring a rise or fall of pressure in the low pressure main. This timing, of course, may be varied to suit conditions.

The controller C and potentiometer P maintain the desired pressure in the low pressure main 2. If the pressure rises or falls the potentiometer operates to unbalance the circuit, thus causing the solenoid of the balanced relay D to operate to move the armature 60 either to the right or left so that the contact 61 engages either of the contacts 62 or 63. This unbalancing of the circuit is imparted to the solenoid of the balanced relay E, causing the contact 70 to engage contact 71 or 72. In accordance with the engagement of the respective contacts the motor M is caused to move in one direction or the other, so that through the medium of the magnetic linkage the pilot control 4, or more specifically the valve of said pilot control, is caused to open or close or vary the portage to permit more gas to the low pressure main or to cut down the supply of gas, so that the effect of the rise and fall of the pressure in the low pressure main at the potentiometer controller is instantly imparted to the pilot control through the medium of the magnetic linkage and circuits, as above explained, to maintain at all times the desired set pressure throughout the low pressure main.

The arrangement of balanced relays and other mechanism above described in the automatic maintenance of pressure in all of the mains throughout the system may be automatically controlled, and in the event of failure of the automatic control to properly function it will be entirely eliminated as an operating system until the trouble is overcome, so that it will not in any way interfere with the operation of district governors such as now employed, for as soon as the magnetic linkage is de-energized the district governor can function normally, and regardless of conditions there can be no impairage of control such as now employed; in other words, the system as now in use is efficient up to a certain point, but with my improved automatic control, fluctuations in pressure are reduced to an absolute minimum, and in my improved system I provide for every possible contingency to de-energize the magnetic linkage in the event of failure of the automatic system.

Briefly setting forth the operation of the system, we will assume that at the potentiometer control location of the low pressure main the pressure is what is required and desired, and in that event the parts will be balanced, as illustrated. Should there be a rise or fall of pressure in the low pressure main the potentiometer will move, causing an unbalancing of the circuit. This will unbalance the solenoid D causing the contact 61 to close the circuit and unbalance the solenoid E. This will cause the contact 70 to engage one of the contacts 71 or 72, closing the circuit to the motor; when the impulse timer operates the motor will be caused to move to further open or close the valve of the pilot control. As long as the circuits remain unbalanced the impulse timer will close the circuit to the motor every thirty seconds. When the pressure becomes normal in the low pressure main the potentiometer moves to the center point of resistance of coil 12 and the relays D and E will become balanced, the circuits will be opened and the motor will cease to function.

While I have illustrated what I believe to be the preferred embodiment of the invention, it is obvious that various slight changes may be made with regard to the form and arrangement of parts without departing from my invention, and hence I do not limit myself to the precise details set forth but consider myself at liberty to make such changes and alterations as fairly fall within the spirit and scope of the claims.

What I claim is:

1. A pressure control apparatus including a container for high pressure fluid and a container for low pressure fluid, a governor between the containers, means for normally controlling the operation of the governor and including a motor, an electromagnetic coupling means operatively connecting the motor and the governor, a potentiometer operatively connected with the low pressure container, and a balanced relay including an electric circuit with the potentiometer and the motor.

2. A pressure control apparatus including a container for high pressure fluid and a container for low pressure fluid, a governor between the containers, means for normally controlling the operation of the governor and including a motor, an electromagnetic coupling means operatively connecting the motor and the governor, a potentiometer operatively connected with the low pressure container, a balanced relay including an electric circuit with the potentiometer and the motor, and an impulse timer in the circuit imparting impulses to the motor when the circuit is unbalanced.

3. A pressure control apparatus including a container for high pressure fluid and a container for low pressure fluid, a governor between the containers, means for normally controlling the operation of the governor and including a motor, an electromagnetic coupling means operatively connecting the motor and the governor, high and low pressure cut-outs communicating with the low pressure container, and a short circuiting relay included in an electric circuit with said high and low pressure cut-outs.

4. A pressure control apparatus including a container for high pressure fluid and a container for low pressure fluid, a governor between the containers, means for normally controlling the operation of the governor and including a motor, an electromagnetic coupling means operatively connecting the motor and the governor, a potentiometer operatively connected with the low pressure container, a balanced relay included in an electric circuit with the potentiometer and the motor, high and low pressure cut-outs communicating with the low pressure container, and a short circuiting relay included in an electric circuit with said high and low pressure cut-outs.

5. A pressure control apparatus including a container for high pressure fluid and a container for low pressure fluid, a governor between the containers, means for normally controlling the operation of the governor and including a motor, an electromagnetic coupling means operatively connecting the motor and the governor, a potentiometer operatively connected with the low pressure container, a balanced relay including an electric circuit with the potentiometer and the motor, an impulse timer in the circuit imparting impulses to the motor when the circuit is unbalanced, high and low pressure cut-outs communicating with the low pressure container, and a short circuiting relay included in an electric circuit with said high and low pressure cut-outs.

6. A pressure controlled apparatus including a high pressure main, a low pressure main, a district governor between the mains, means for normally controlling the operation of the governor and including a pilot control for the district governor, a motor having a shaft adapted to oscillate through 180°, an electromagnetic coupling means operatively connecting the shaft and the pilot control, high and low pressure cut-outs communicating with the low pressure main, a potentiometer operatively connected with the low pressure main, a balanced relay, and a short circuiting relay, said potentiometer, said balanced relay, said short circuiting relay, said high and low pressure cut-outs, an impulse timer, said magnetic linkage and said motor included in electric circuits so that the operation of the potentiometer unbalances the circuit which reverses the motor, and the operation of either of the cut-outs functions to de-energize the magnetic linkage through the medium of the short circuiting relay.

7. A pressure control apparatus including a container for high pressure fluid and a container for low pressure fluid, a governor between the containers, means for normally controlling the operation of the governor and including a motor, an electro-magnetic linkage operatively connecting the motor and the governor, electric means operatively connected with the low pressure container, an electric circuit including a balanced relay in circuit with said electric means, said circuit controlling the operation of said motor, and an impulse timer included in said circuit.

8. A pressure control apparatus including a container for high pressure fluid and a container for low pressure fluid, a governor between the containers, means for normally controlling the operation of the governor and including a motor, an electro-magnetic linkage operatively connecting the motor and the governor, an electric circuit including a balanced relay controlling the operation of the motor, electric means operatively connected with the low pressure container and operated by pressure within the low pressure container to balance or unbalance the circuit, and an impulse timer in said circuit.

9. A pressure control apparatus comprising a high pressure fluid main, a low pressure fluid main, a governor between the mains capable of maintaining a predetermined pressure of fluid in the low pressure fluid main, means for normally controlling the operation of the governor and including a motor, electromagnetic coupling means between the motor and the governor, an electric circuit, an electric means operatively connected with the low pressure fluid main and included in said circuit, a motor circuit, means controlled by the first-mentioned circuit for controlling the closing and opening of the motor circuit, said governor being released from the normal controlling means only upon accidental failure of the means for normally controlling operation of the governor.

10. A pressure control apparatus comprising a high pressure fluid main, a low pressure fluid main, a governor between the mains capable of maintaining a predetermined pressure of fluid in the low pressure fluid main, means for normally controlling the operation of the governor and including a motor, electromagnetic coupling means between the motor and the governor, an electric circuit, an electric means operatively connected with the low pressure fluid main and included in said circuit, a motor circuit, means controlled by the first-mentioned circuit for controlling the closing and opening of the motor circuit, said governor being released from the normal controlling means only upon accidental failure of the means for normally controlling operation of the governor, a third circuit parallel to the motor circuit and controlling the electromagnetic coupling means, means caused to be set in operation when the pressure in the low pressure main varies sufficiently from a predetermined degree for causing short circuiting of the last-mentioned circuit.

PHILIP B. R. BAAS.